March 28, 1961 K. O. TIMOTHY ET AL 2,977,583

DIGITAL TIME ENCODER

Filed Sept. 19, 1955 3 Sheets-Sheet 1

INVENTORS.
KEITH O. TIMOTHY
MILTON L. PATRICK

BY

Christie, Parker & Hale
ATTORNEYS

March 28, 1961 K. O. TIMOTHY ET AL 2,977,583

DIGITAL TIME ENCODER

Filed Sept. 19, 1955

3 Sheets-Sheet 2

INVENTORS.
KEITH O. TIMOTHY
MILTON L. PATRICK

BY

Christie, Parker & Hale

ATTORNEYS

INVENTORS.
KEITH O. TIMOTHY
MILTON L. PATRICK
BY
Christie, Parker & Hale
ATTORNEYS United States Patent Office 2,977,583

Patented Mar. 28, 1961

2,977,583

DIGITAL TIME ENCODER

Keith O. Timothy, Sierra Madre, and Milton L. Patrick, Anaheim, Calif., assignors, by mesne assignments, to Consolidated Electrodynamics Corporation, Pasadena, Calif., a corporation of California Filed Sept. 19, 1955, Ser. No. 534,957

2 Claims. (Cl. 340—355)

This invention relates to the general fields of analog-to-digital conversion and chronology, and it has particular reference to time encoder apparatus for generating electrical output signals representing time.

With many forms of data recorded today, it is necessary that some form of time be recorded along with the data. For example, where magnetic tape is used as a medium for recording some objective phenomenon, a timing signal may be recorded on the tape in a separate channel at the same time the objective phenomenon is being recorded. Conventionally, the timing signal is a constant frequency alternating signal obtained from an oscillator. When the tape is played back, this timing signal may be utilized to advantage in many ways. For example, the timing signal may be written on a visual record along with the objective phenomenon, such as through the use of a recording oscillograph. Since spurious variations in tape speed during the recording process alter both the recorded data and the timing signal in the same manner, the printed timing signal serves as a very accurate vernier time scale along the record.

While the conventional timing signals mark equal time increments along the record, they do not identify any particular point of time on the record. Records of objective phenomenon are generally quite extensive in length and since only portions of the recorded phenomenon are usually of any interest, these portions are ordinarily separated from the rest of the record for more convenient handling. If points of time are not manually identified on the record portions of interest prior to severance, the time order of events may be lost. Further, such manual time identification is a tedious procedure, and present automatic arrangements for identifying time from the original timing signal involve additional processing of the entire record and also involve additional expensive equipment.

The present invention solves the problem of time identification by providing timing signals which in themselves are an identification of particular times from point to point along the record. These timing signals can be recognized visually and they can also be used to initiate actions at proper times when the record is being processed by computers and other data handling equipment. That is, the timing signals provided by the present invention may be reduced to visual form on a visual record whereupon time may be identified with the naked eye, or on the other hand they may be left in electrical form where time may be identified by electro-mechanical means responsive to the time identification provided by the signals.

The apparatus of the invention may be called a time encoder and it embodies several advantages including the continuous production of timing signals at a predetermined frequency so as to provide a regular signal train which inherently is a time scale, while at the same time periodically varying the amplitude of certain signals in the train so as to combine an actual time identification at regular intervals along the train with the time scale.

Accordingly, the time encoder apparatus comprises a multiple position switching means, means for advancing said switching means through its positions cyclically and at a substantially constant rate, and means electrically coupled to said switch positions for supplying electrical energy at different voltage levels, said last named means comprising means for producing coded voltage levels identifying time at a plurality of said switch positions, and means providing voltage levels distinguishable from said coded voltage levels at the other switch positions. This results in a train of electrical timing signals having a substantially constant frequency and periodically including amplitude variations which provide a coded time identification at spaced intervals.

In a preferred embodiment of the invention, the means for producing coded voltage levels identifying time at a plurality of the switch positions includes a plurality of electrical circuits coupled to these switch positions, said electrical circuits including a plurality of binary-coded commutator and brush combinations, shift register means for periodically changing the state of actuation of the commutator and brush combinations in accordance with a binary-coded representation of time, and means for driving the shift register in synchronism with the multiple position switching means so that changes in the state of actuation of the commutator and brush combinations occur coincident with intervals when the switching means is advancing through its other switch positions.

As will be seen, the apparatus of the invention may be, and preferably is, largely mechanical. A balanced mechanical design is obtained when the multiple position switching means is in the form of a master commutator and brush combination mounted on the shift register, and with the means for advancing the switching means and the means for driving the shift register in synchronism therewith being in the form of a constant speed motor linked mechanically to the shift register and to the master commutator and brush combination.

The invention is explained in detail with reference to a preferred embodiment shown in the accompanying drawings in which.

Figure 1:
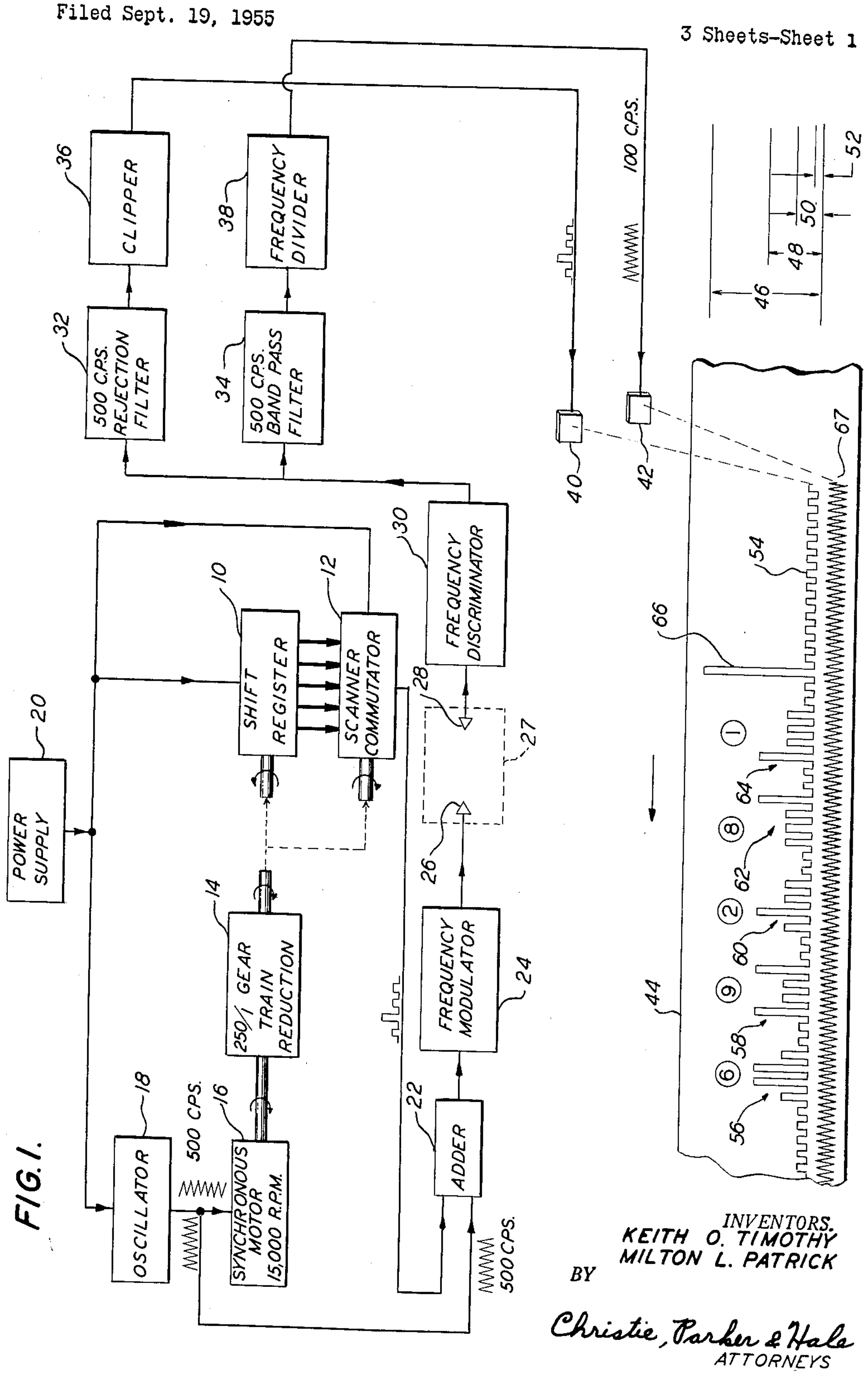
Fig. 1 is a schematic representation of the invention together with apparatus for reducing the timing signals to visual form.

Referring now to Fig. 1, an electro-mechanical shift register 10 and a master commutator and brush combination hereinafter referred to as the scanner commutator 12 are driven through a gear train 14 by a synchronous motor 16 which derives its power from an oscillator 18, the oscillator being energized by a power supply 20. Thus, the speed of the motor shaft is determined primarily by the frequency of oscillation of the oscillator, which frequency can be held at a pre-set constant value to a high degree of accuracy. As shown, the oscillator oscillates at a frequency of five hundred cycles per second driving the synchronous motor at fifteen thousand revolutions per minute with the gear train providing a two hundred and fifty to one speed reduction and thereby supplying the shift register and the scanner commutator rotary movement at the rate of one revolution per second. This rotary movement may be deemed a constant analog function and the rate of one revolution per second is a convenient time base.

The scanner commutator produces electrical pulses at a rate of fifty pulses per second, and the action of the shift register is to determine the voltage level of some of the pulses so that they may be used to identify each second of time in accordance with a binary decimal code. The output of the oscillator may be utilized to provide an additional time scale between identified times, supplementing the time scale provided inherently by the fifty pulses per second.

The output from the scanner commutator and the output from the oscillator may be applied to an adder 22 which combines these separate outputs directly into a composite signal. The composite signal may be applied through a frequency modulator 24 to produce a modulated carrier signal which in turn may be applied to a recording head 26 which records the modulated carrier signal onto magnetic tape. The adder and the frequency modulator comprise what may be termed a signal combiner circuit and show one conventional way of accomplishing the combining of the output signals so that they may be conveniently recorded together on a single channel on the magnetic tape.

Later, when the tape is played back (or in some instances immediately following the recording head where the signal is desired to be picked up), the modulated carrier signal is sensed by a reading head 28 and applied to a signal separator circuit which includes a frequency discriminator 30, a five hundred cycle per second rejection filter 32, a five hundred cycle per second band-pass filter 34, a clipper circuit 36 and a frequency divider 38, all of which function conventionally to separate the output signals once again. As shown in Fig. 1, the output from the clipper portion of the signal separator circuit is the fifty pulses per second derived from the scanner commutator and the output from the frequency divider is the alternating signal derived from the oscillator which has been divided by the divider circuit 38 from five hundred cycles per second down to one hundred cycles per second. It should be noted that any number of frequency multipliers or dividers may be used so that any number of alternating current signals may be derived from the oscillator at desired frequencies. The dotted line enclosure 27 shown in Fig. 1 represents the functional tie-in between the recording head 26 and the reading head 28, i.e. the process of recording and reading information off of a recording medium such as magnetic tape.

The separated signals are each applied to one of a pair of recording galvanometers 40, 42 such as might be found in a recording oscillograph. A sheet of photosensitive paper 44 is passed by the recording galvanometers and the galvanometers record a visual record of the signals they receive from the signal separator circuit.

As can be seen on the photosensitive record shown in Fig. 1, the fifty pulses per second output comprises pulses of different height and voltage value. To best explain this, dimensions are drawn beside the photosensitive record shown in Fig. 1 wherein the dimension 46 represents "action" voltage level, the dimension 48 represents binary "yes" voltage level, the dimension 50 represents binary "no" voltage level and the dimension 52 represents "pulse" voltage level. Viewing the visual record again, the scanner commutator produces fifty pulses per second, including those shown at 54 having "pulse" voltage magnitude. The shift register produces contact closures identifying time. The scanner commutator scans the output of the shift register once each second causing five sets of four each of the fifty pulses per second as shown at 56, 58, 60, 62 and 64 respectively to assume binary "yes" and "no" voltage levels in accordance with the time identification provided by the contact closures of the shift register. In each set of four pulses the first pulse represents the number value 1, the second pulse represents the number value 2, the third pulse represents the number value 4, and the fourth pulse represents the number value 8.

When a pulse in one of these sets is at its binary "yes" voltage level, its number value is significant and is counted and added to the number value of any other pulses in the same set of four pulses which are also at the binary "yes" voltage level. This is conventional binary decimal coding. Accordingly, the five sets of four pulses each shown in Fig. 1 on the visual record represent the elapsed time of 69,281 seconds as depicted by the encircled numerals. These five sets of pulses will be generated once each second, and collectively may be called a time identification group.

An "action" pulse 66 is shown on the visual record. This action pulse is unique and is provided by the scanner commutator once each second and may be used to identify the points along the record to which the successive numerical time identification groups apply, that is, to mark the point identified by each succeeding group of five sets of time identification signals along the record. Also the action pulse may be used to initiate action in a computer or other electro-mechanical data handling mechanism in accordance with the time identification information. In some instances such an action pulse is not necessary, and any point on the time identification sets of pulses themselves may be chosen to designate the ending or beginning of a new second and the point to which the time designation applies.

A scale of time between each of the successive identified points of time along the record is provided by the fifty pulses per second output from the scanner commutator. An additional and more accurate time scale may be provided by the alternating signal 67 derived from the oscillator 18 and printed alongside the fifty pulses per second on the visual record. Thus, whether a visual record or an electrical record, portions of the record may be extracted and still retain both identified points of time and a time scale in between the identified points. As shown on the visual record, the time scale is provided in fiftieth parts of a second by the fifty pulses per second scanner commutator output and is provided in hundredth parts of a second by the alternating signal 67 derived from the oscillator.

Figure 2:
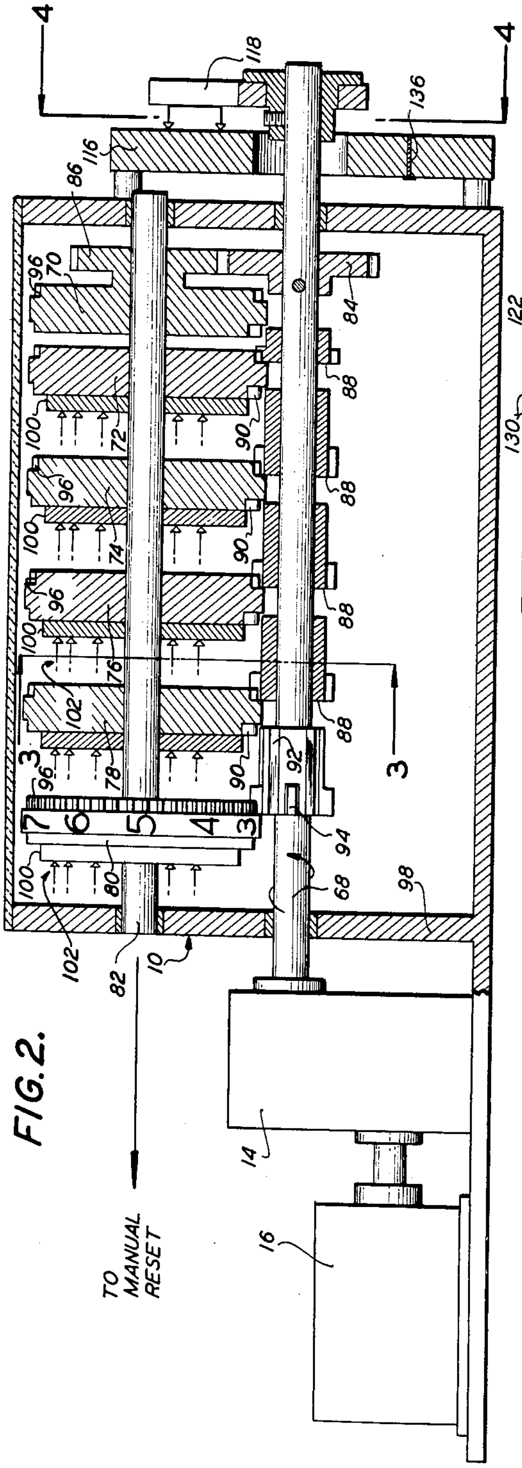
Fig. 2 is a schematic drawing in partial section of the shift register and scanner commutator arrangement of Fig. 1.

A better appreciation of the timing signals is obtained through a detailed consideration of the apparatus of the invention. Referring now to Fig. 2, the synchronous motor 16 together with the gear train 14 drives the input shaft 68 of the shift register 10 at one revolution per second. The shift register includes six dials 70, 72, 74, 76, 78, 80 rotatably mounted on a jack shaft 82. Rotary movement is supplied to the lowest order dial 70 by means of a drive gear 84 affixed to the input shaft 68 and a driven gear 86 affixed to the dial 70. The gear ratio between the drive gear 84 and driven gear 86 is a one to one ratio, therefore the lowest order dial 70 is driven smoothly at one revolution per second.

Periodic rotary movement is supplied to the succeeding higher order dials 72 to 80 from the lowest order dial 70. This is accomplished by providing a plurality of coupling gears 88 which ride freely on the input shaft 68 and intercouple the successive dials so that one revolution of any lower order dials causes, approximately during the last tenth part of said revolution, a one tenth revolution of the next higher order dial. To accomplish this action each dial has a slot cut in its face as shown at 90 and with each revolution of the dial, the slot engages one of four long teeth such as the tooth shown 92 turning the coupling gear one quarter revolution. A short tooth such as shown at 94 is provided at the opposite end of each coupling gear and between each pair of the long teeth. Thus, each coupling gear 88 has four teeth at one end and eight teeth at the opposite end. The back of each of the dials 72 to 80 is provided with a gear portion as shown at 96, these gear portions each having twenty teeth which engage the eight tooth portion of the respective coupling gears. Thus, with each revolution of a lower order dial, the next high order dial is turned one tenth revolution, the turning action taking place approximately during the last one tenth part of the single revolution of the lower order dial.

This turning action is sometimes referred to as Geneva type transfer. For any who might have difficulty understanding its operation, it is instructive to mention that practically all odometers for measuring mileage on automobiles are constructed in this manner. In fact, such an odometer was obtained and modified slightly for use in the shift register in constructing the prototype of the time encoder of the invention. As indicated in Fig. 2, the dials may be re-set to their zero positions by engaging a manual re-set, which feature is provided on most all odometers and needs no detailed description here.

Thus, the lowest order dial 70 undergoes smooth rotary movement and provides the Geneva type transfer to the next higher order dial 72, the dial 72 providing Geneva type transfer to the dial 74 etc. onto the dial 80. It should be noted then that all rotary movement of any of the dials 72 to 80 takes place only during the same time interval of approximately one tenth second or less, this time interval occurring once each second. Thus, for about nine tenths of each second the dials 72 through 80 are at rest.

Each of the dial members 72 to 80 is provided with a decimal decade of visible numbers as shown on the dial 80 written around the periphery of the dial. Thus, just as an odometer in an automobile counts the miles traveled, the shift register here counts the number of seconds elapsed and the number of elapsed seconds can be read off by reading the numbers exposed through a window (not shown) in the case 98. With the input shaft 68 being driven at one revolution per second turning the lowest order dial 70 at one revolution per second, the dial 72 counts the units number of seconds, the dial 74 counts the tens number of seconds, the dial 76 counts the hundreds number of seconds, the dial 78 counts the thousands number of seconds, and the dial 80 counts the ten thousands number of seconds.

To reduce this visual indication of seconds into a positive electrical indication, a binary decimal coded commutator such as shown at 100 is connected on the face of each of the dials 72 to 80 and a plurality of brushes such as shown at 102 are provided for each commutator. The brushes read off the angular position of each commutator in accordance with the binary decimal code and thereby provide an electrical indication of the visual reading of each dial.

Figure 3:
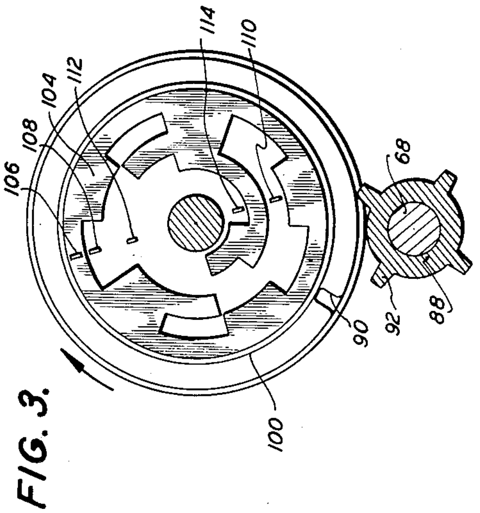
Fig. 3 is a view taken along line 3—3 of Fig. 2.

As shown typically in Fig. 3, each dial commutator has a pattern of conductive material 104 disposed on its face according to a binary decimal code. Each plurality of brushes includes a common brush 106 which energizes the pattern of conductive material, a value one brush 108 for sensing the number one binary "yes" and "no" values in accordance with whether the brush is on or off of the conductive material, a value two brush 110 for indicating binary "yes" and "no" number two values by a similar operation; and a similar acting value four brush 112 and a value eight brush 114.

As can be seen in Fig. 3, each one tenth revolution jump of the dial moves the pattern so that the brushes contact a new sector of the pattern having a different configuration than the preceding sector. Upon examination of the pattern shown in Fig. 3, it can be seen that the pattern is divided into ten such sectors, each sector being different from the others. As the pattern shifts, the brushes are disposed centrally in one sector and then centrally in the next succeeding sector which feature allows for liberal tolerances in the pattern dimensions and orientation.

With the brushes in the position shown in Fig. 3, none of the value brushes are touching the conductive pattern, and the electrical indication is that the dial is at zero. As the dial rotates one tenth revolution in the direction shown by the arrow, the pattern moves with respect to the brushes and the value one brush 108 will come into contact with the conductive pattern, although the value two, four and eight brushes will still be out of contact with the pattern, thereby providing a binary "yes" readout of one indicating that the dial position is now at one. As the commutator continues to rotate, the sum of the values of binary "yes" indications from the brushes on each binary coded commutator will go from zero to nine in cycles just as the visual indication goes from zero to nine as the dial makes one revolution.

It can be said then that the conductive pattern on each binary coded commutator plate acts as a set of electrical contacts and that the brushes act as a plurality of electrical taps for each set of contacts. The shift register then responds to the action of the synchronous motor and provides a periodic relative motion between the respective taps and sets of contacts, thereby producing successive electrical closures between said taps and contacts in accordance with elapsed time.

Figure 4:
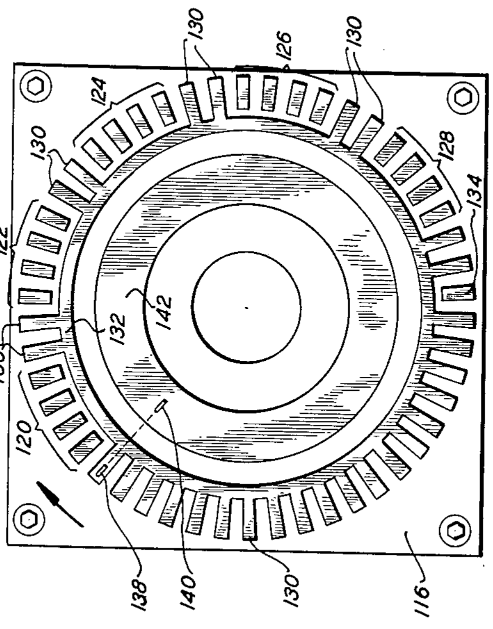
Fig. 4 is a view taken along line 4—4 of Fig. 2.

Referring now to Figs. 2 and 4, the input shaft 68 of the shift register extends out the back of the shift register through a scanner commutator plate 116 and connects to a brush carrier 118 which it rotates at a rate of one revolution per second. The scanner commutator plate 116 is connected to the case 98 and does not move. The scanner commutator plate has fifty switch positions defined by fifty conductive segments disposed in a ring on its face for producing the fifty pulses per second output signal. In this ring of fifty segments there are five sets of four separate segments each as shown at 120, 122, 124, 126 and 128. These respective sets of isolated segments are separated by pulse segments 130 which are connected to all other pulse segments by a ring of conductive material 132. The isolated segments of each respective set are severally connected electrically to the separate brushes of each plurality of brushes riding on the several binary coded commutators. For example, the segments in the set 120 from left to right are directly connected electrically to the value one brush, the value two brush, the value four brush and the valve eight brush respectively of the plurality of brushes 102 associated with the highest order commutator 100, this commutator being on the dial 80 and reading in terms of ten thousands of seconds. The other sets of segments are connected to the brushes associated with the lower order commutators, with the last set of segments 128 being connected to corresponding brushes of the plurality of brushes 102 contacting the lowest order commutator which is connected on the face of the disk 72. A separate single isolated segment 134 is used to produce the "action" pulse. All the connections to the segments on the face of the scanner commutator are made by feed-through connections from the back side of the scanner commutator plate, such a feed-through connection being shown at 136.

The brush carrier 118 carries a pair of brushes 138, 140 and rotates in the direction shown by the arrow with the brush 138 making successive contact with the fifty segments in the ring and with the brush 140 riding around an annular slip ring 142 also printed on the face of the scanner commutator plate. The brushes 138 and 140 are shorted together so that the voltages picked up by the brush 138 from the segments are fed to the conductive slip ring, the conductive slip ring being the output terminal for the shift register and scanner commutator arrangement.

In order to avoid an ambiguous read-out, it follows that the five sets of isolated segments on the scanner commutator must occupy less than 324° around the ring of segments so that the five sets of isolated segments may be scanned while the disks are stationary in the shift register. This may be more apparent when it is considered that 324° is nine tenths of a cycle and corresponds on the scanner commutator to nine tenths of a second, since the brushes 138, 140 are moving at one cycle per second. As previously explained, all motion of the disks in the shift register takes place over a period of approximately one tenth of a second or less. The disc motion is synchronized with the periods when the scanner commutator brushes are traversing segments other than the five sets in the ring, this synchronism being maintained by the mechanical interconnection with the shaft 68 previously described. Thus, the output on the slip ring 142 is always positive and discrete.

Figure 5:
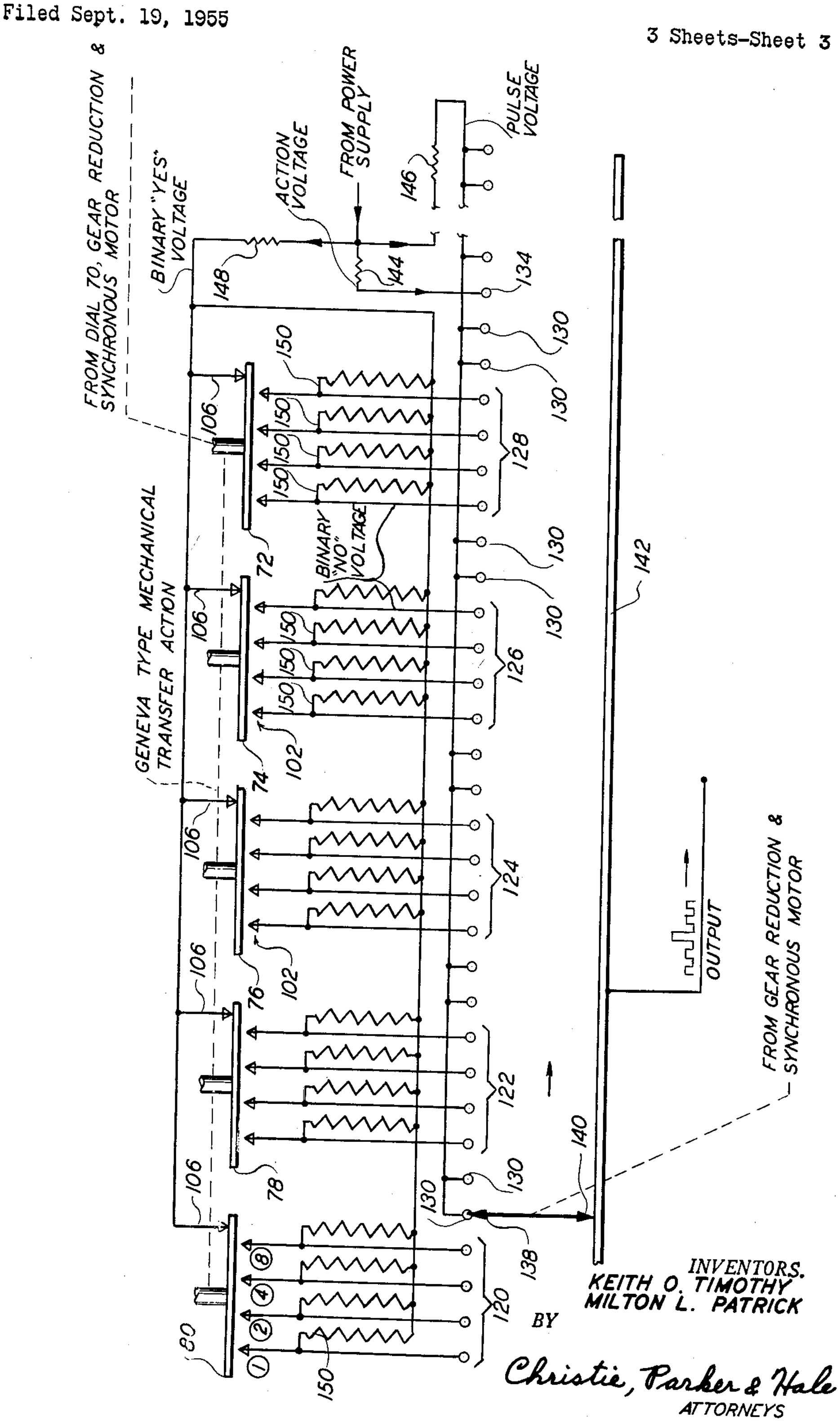
Fig. 5 is a schematic circuit diagram showing the electrical circuitry of the shift register and scanner commutator arrangement of Figs. 1 and 2.

Referring now to Fig. 5, the means for producing pulses at different levels may be described in detail. The drawing is a schematic representation of a linear arrangement of the segments and slip ring on the scanner commutator and shows the electrical connections to the brushes riding on the binary coded commutators.

By means of attenuator resistors 144, 146, 148 three voltage levels are derived from the power supply 20 of Fig. 1. The binary "yes" voltage is derived through resistor 148 and applied to the respective common brushes 106 to energize the conductive patterns on the binary coded commutators. The unique "action" voltage level is derived through resistor 144 and applied directly to the "action" pulse segment 134 on the scanner commutator. The "pulse" voltage is derived through resistor 146 and applied to the pulse segments 130 on the scanner commutator. The binary "no" voltage level is derived by applying the binary "yes" voltage through separate parallel attenuator resistors 150 to each of the brushes in all of the pluralities of brushes 102.

Thus, as the scanner commutator brushes 138, 140 scan the segments on the scanner commutator, different levels of voltage will be applied to the slip ring 142 depending upon what level of voltage is supplied to the various segments of the scanner commutator. In the five sets of independent segments 120, 122, 124, 126, 128 each segment will provide the binary "yes" voltage, if its corresponding brush is contacting the conductive pattern on the associated commutator. If the brush is not contacting the conductive pattern, then the segment will provide the lesser binary "off" voltage level which it always receives through the resistor 150.

It should be noted that a primary function of the scanner commutator is to periodically scan the output of the shift register, providing thereby a binary coded decimal identification of elapsed time in seconds every second to a total of 99,999 seconds. Of course, by changing the various gear ratios, the time base can be varied to represent different parts of seconds at different rates.

It is to be understood that different types of shift registers may be employed. For example, another electromechanical type is ganged stepping switches which have been used successfully to provide contact closures identifying time, such switches operating from electrical pulses to perform the equivalent of the Geneva type transfer action of the shift register shown in the drawings. However, it has been found that the binary coded commutator arrangement shown in Figs. 2 and 3 is the more desirable type of shift register because it is lighter, smaller, and less expensive, the former two of which factors are particularly important in the airborne instrumentation field.

We claim:

1. Time encoder apparatus for producing continuously a train of electrical timing signals having a substantially constant frequency and periodically including amplitude variations which provide a coded time identification at regularly spaced intervals, said apparatus comprising multiple position switching means, means for driving said switching means through its positions continuously in repetitive cycles and at a substantially constant predetermined rate, and means electrically coupled to said switch positions for supplying electrical energy at different voltage levels, said last named means comprising means for producing coded voltage levels at a plurality of said switch positions and means provided voltage levels distinguishable from said coded voltage levels at the other switch positions, said means for producing coded voltage levels at said plurality of switch positions comprising a plurality of electrical circuits coupled to these switch positions, said electrical circuits including a plurality of binary-coded commutator and brush combinations, shift register means for periodically changing the state of actuation of the commutator and brush combinations in accordance with a binary-coded representation of time, and means for driving the shift register in synchronism with the multiple position switching means so that changes in the state of actuation of the commutator and brush combinations occur coincident with intervals when the switching means is advancing through said other switch positions.

2. Apparatus of claim 1 wherein the multiple position switching means comprises a master commutator and brush combination mounted on the shift register, and wherein the means for advancing the switching means and the means for driving the shift register in synchronism therewith comprises a constant speed motor linked mechanically to the shift register and to the master commutator and brush combination.

References Cited in the file of this patent

UNITED STATES PATENTS

| | | |
|---|---|---|
| 1,897,657 | Yates | Feb. 14, 1933 |
| 1,955,043 | Yates | Apr. 17, 1934 |
| 2,318,591 | Couffignal | May 11, 1943 |
| 2,344,254 | Leathers | Mar. 14, 1944 |
| 2,352,440 | Leathers | June 27, 1944 |
| 2,493,709 | Wittenmyer | Jan. 3, 1950 |
| 2,560,124 | Mofenson | July 10, 1951 |
| 2,630,481 | Johnson | Mar. 3, 1953 |
| 2,697,648 | Kerr et al. | Dec. 21, 1954 |
| 2,713,680 | Ackerlind | July 19, 1955 |
| 2,733,008 | D'Andrea | Jan. 13, 1956 |
| 2,755,020 | Belcher | July 17, 1956 |
| 2,774,063 | Grinstead | Dec. 11, 1956 |
| 2,783,455 | Hindall | Feb. 26, 1957 |
| 2,867,796 | Kendall | Jan. 6, 1959 |